United States Patent [19]

Bishop et al.

[11] Patent Number: 4,473,843

[45] Date of Patent: Sep. 25, 1984

[54] DIGITAL RADIOGRAPHIC SYSTEM AND METHOD FOR ADJUSTING SUCH SYSTEM

[75] Inventors: Marc D. Bishop, Forest Park; Oreste J. Lucchesi, Bloomingdale, both of Ill.

[73] Assignee: Siemens Gammasonics, Inc., Des Plaines, Ill.

[21] Appl. No.: 400,053

[22] Filed: Jul. 20, 1982

[51] Int. Cl.³ .............................................. H04N 5/32
[52] U.S. Cl. ................................... 358/111; 358/228; 364/414; 378/99
[58] Field of Search .................. 358/111, 228; 378/99; 364/414

[56] References Cited

U.S. PATENT DOCUMENTS 4,300,167 11/1981 Miller .................................. 358/228
4,355,331 10/1982 Georges ............................. 358/111

OTHER PUBLICATIONS

G. S. Carrera et al, "Diagnostic Imaging" Nov. 1981, pp. 66 and 67.

Primary Examiner—Howard W. Britton
Attorney, Agent, or Firm—Karl F. Milde, Jr.

[57] ABSTRACT

An X-ray detector receives X-ray radiation from an object under examination and generates a detector image thereof. An image intensifier including a screen enhances the detector image and generates an image intensifier image which emits light. A video camera views the image intensifier image and generates a video signal comprised of frames of digital data. These data describe the signal levels of the image intensifier image. A display device connected to the camera receives the video signal and displays an image in accordance with the distribution of X-ray radiation. An iris is arranged between the image intensifier and the video camera. The iris has an aperture of variable size for controlling the intensity of light transmitted from the image intensifier to the video camera. A control circuit is provided for controlling the aperture of the iris. This control circuit comprises a first storage device receiving the video signal and storing digital data corresponding to one of the frames, a threshold device for determining the maximum signal level of the digital data contained in the stored frame, a second storage device sorting information about parameter values indicative of a plurality of aperture sizes and about maximum image signal levels corresponding to these sizes ("look-up" table), a device evaluating from the maximum signal level and from the information stored in the second storage device a desired parameter indicative of a desired size of the aperture, and a device for setting the actual size of the aperture, whereby the setting device is responsive to the desired parameter evaluated by the evaluating device.

16 Claims, 4 Drawing Figures

DIGITAL RADIOGRAPHIC SYSTEM AND METHOD FOR ADJUSTING SUCH SYSTEM

BACKGROUND OF THE INVENTION

1. Field of the Invention

This invention relates to a system and a method for radiographic examinations. In particular, this invention relates to automatic iris adjustment techniques in digital radiography.

2. Description of the Prior Art

In conventional radiography, a large number of radiographs has to be repeated because of incorrect automatic exposure control (see G. S. Carrera et al, "Diagnostic Imaging", Nov. 1981, p. 66 and 67). Analysis of 500 films exposed using automatic exposure control demonstrated that 80.8% were repeated because of position errors, including over and underexposure caused by inaccurate positioning over the phototimer cell. Overexposure and underexposure with correct positioning accounted for 16% repeat examinations, according to the aforementioned study.

In a digital radiographic system, such as that sold under the Trademark DIGITRON by Siemens Gammasonics, Des Plaines, Ill., 1 to 50 or even more exposures are taken in a sequence and stored for later processing. In such a digital radiographic system a similar exposure problem exits, but on a larger scale. Therefore, it is essential that the exposure level is correct and that intensity adjustments can be made by means of an iris.

In other words, it is desirable to implement a radiographic system which alleviates the over and/or underexposure problem. The clinician should be able to see the image exposure to determine if the image contrast is satisfactory. If it is not satisfactory, the clinician should be able to correct it accordingly and see the result without re-exposing the patient. Such a radiographic system would result in a minimum radiation exposure to the patient.

SUMMARY OF THE INVENTION

1. Objects

It is an object of this invention to provide an apparatus and a method for image quality checks in a digital radiographic system determined for examinations of an object, which apparatus and method do not require the object under examination to be continually exposed to X-rays while said quality checks are carried out.

It is another object of this invention to provide automatic exposure control through iris adjustments in a digital radiographic system.

It is still another object of this invention to provide a medical digital radiographic system with automatic iris adjustment features for achieving a high image quality with low patient X-ray exposure.

It is still another object of this invention to provide a digital imaging system with an iris diaphragm control providing automatic settings for optimum video intensity.

2. Summary

According to this invention, a digital radiographic system contains an X-ray detector for receiving X-ray radiation from an object under examination. This X-ray detector generates a detector image in accordance with the distribution of the X-ray radiation received from the object. The system also contains an image intensifier including a screen and means for enhancing the detector image. The image intensifier generates an image on the screen which image emits light. The system also contains a video camera which views the image intensifier image. This camera generates a video signal comprised of frames of digital data that describe various signal levels in accordance with the image intensifier image. The system also contains a display device which is operationally connected to the video camera. It receives the video signal and display an image in accordance with the distribution of X-ray radiation.

An iris is arranged between the image intensifier and the video camera. This iris has an aperture of variable size for controlling the intensity of light transmitted therethrough. Thereby the iris controls the intensity of the light which is transmitted from the image intensifier to the video camera.

A control apparatus is provided for controlling the aperture of the iris. This control apparatus comprises a first storage device for receiving the video signal and for storing the digital data corresponding to one of the frames. It also comprises a threshold unit for determining the maximum signal level of the digital data which is contained in the stored frame.

It also comprises a second storage device for storing information about parameter values which are indicative of a plurality of sizes of the aperture and about the maximum image signal level corresponding to these sizes. The control device also contains an evaluating device which determines from the maximum signal level and from the information stored in the second storage device a desired parameter which is indicative of a desired size of the aperture. The control device also comprises an actuating device for setting the actual size of the aperture. This device is responsive to the desired parameter evaluated by the evaluating device.

According to this invention, a method for automatically adjusting the aperture size of the iris in a digital radiographic system which generates images of an object under examination, comprises the steps of:

(a) generating a light emitting image of the object under examination;

(b) generating a video signal comprised of digital data which are assigned to the intensities of a plurality of pixels of the image;

(c) storing the video signal;

(d) determining the highest data level among the plurality of pixels;

(e) comparing the highest data level to predetermined maximum signal levels related to predetermined aperture sizes of the iris; and (f) adjusting the actual size of the aperture in accordance with the evaluated designed parameter.

The predetermined maximum signal level may be provided in the form of a reference table, known as a "look-up" table, in a computer such as a microprocessor.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

Figure 1:
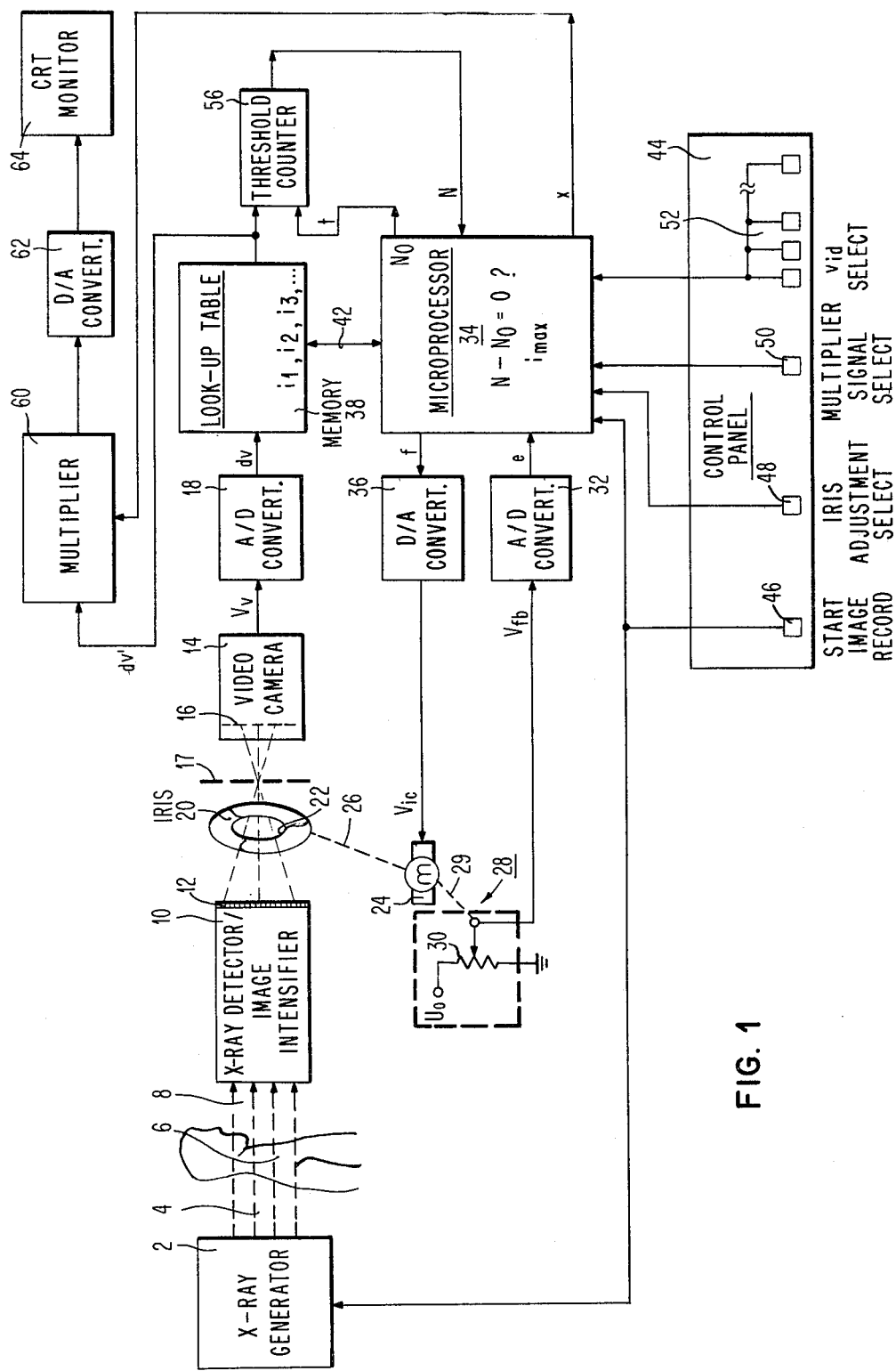
FIG. 1 is a schematic diagram, partially in block form, of a digital radiographic system incorporating an iris control mechanism according to this invention.

In FIG. 1, a digital radiographic system is illustrated. In particular, details of an automatic iris adjustment apparatus for such system are illustrated. As will be obvious from the following description, the apparatus overcomes the primary disadvantage of previous methods, namely of continually exposing a patient to radiation while the iris of the radiographic system is being adjusted and while the iris controls work. The apparatus provides for minimum patient X-ray exposure combined with good image quality.

According to FIG. 1, an X-ray generator 2 including an X-ray tube emits X-rays 4 towards an object 6 to be imaged and examined. In particular, the object 6 is a patient undergoing radiographic examinations. The X-rays 8 penetrating the object 6 are received by a conventional X-ray detector/image intensifier unit 10. The unit 10 produces an image of the object 6 according to the penetrability of the X-rays 4, that is, according to the intensity distribution of the X-ray radiation. This image intensifier image is generated on the output screen 12 of the unit 10. The image is a real image, that is it emits visible light.

The image on the output screen 12 is viewed by a video camera or TV camera 14. The video camera 14 may be of the vidicon type. Preferably, however, it is of the lead oxide type. The target for storing the viewed image is designated by 16. A lens system is used to relocate the image from the screen 12 onto the target 16. This lens system is characterized in FIG. 1 by a lens main plane 17. The camera 14 generates at its output a video signal $V_v$ which is an analog signal and which is transmitted to an analog-to-digital converter 18. The analog-to-digital converter 18 issues a digitized video signal dv which, as in conventional applications, is used for display and recording purposes. The digitized video signal dv is comprised of frames of digitized data. Each of these data describes a signal level of a pixel. The digital data of a frame are thus an intensity representation pixel by pixel of the image intensifier image. In other words, the digitized video signal dv represents digitized images. To each location or pixel of the image is assigned a digital value or count value i representing the X-ray intensity at that particular location.

As will be explained later, the camera 14 is not only used to generate the video signals $V_v$ for recording and displaying, but also as a light sensor for controlling purposes so that a separate light sensor is not required.

Between the output screen 12 of the unit 10 and the light input of the video camera 14 is arranged a diaphragm or iris 20. For the sake of clarity, this iris 20 is shown in FIG. 1 in a perspective view. The iris 20 has an aperture 22 of adjustable size for attenuation of the light transmitted from the output screen 12 to the light input of the camera 14. The iris 20 may be a part of the camera 14. The size of the aperture 22 is adjustable by means of an iris position motor drive 24. The operational connection between the motor drive 24 and the iris 20 itself is schematically illustrated by a broken line 26. Any suitable mechanical means such as a shaft and gear combination may be used as the connection 26.

The setting of the motor drive 24 and thus the setting of the iris aperture 22 is measured by a sensor 28. In particular, the sensor 28 comprises a potentiometer 30 having its tap or arm operationally connected to the shaft of the motor drive 24. This shaft connection is illustrated by a broken line 29. The potentiometer 30 which may be electrically grounded is supplied by a constant voltage $U_o$. Thus, a voltage $V_{fb}$ derived from the arm of the potentiometer 30 is a measure of the actual or true position of the motor drive 24 and therefore of the iris size. Of course, any other sensing means 28 that transforms the iris position into a corresponding voltage $V_{fb}$ or into another electrical parameter can be used.

The iris position potentiometer 30 delivers the feedback voltage $V_{fb}$ which reflects the actual position of the motor drive 24 and therefore of the iris 20. This feedback voltage $V_{fb}$ is applied to an input of an analog-to-digital converter 32. The digital output signal e of the converter 32 is fed into a processing unit 34, in particular into a microprocessor.

The iris position motor drive 24 is supplied with an iris control voltage $V_{ic}$ derived from a digital-to-analog converter 36 which in turn is fed by a digital signal f. The signal f and consequently the iris control voltage $V_{ic}$ is derived from an output of the microprocessor 34. The control is performed such that actuation of the motor drive 24 by means of the iris control voltage $V_{ic}$ is performed until the iris aperture 22 has reached a predetermined value which is desired.

Figure 3:
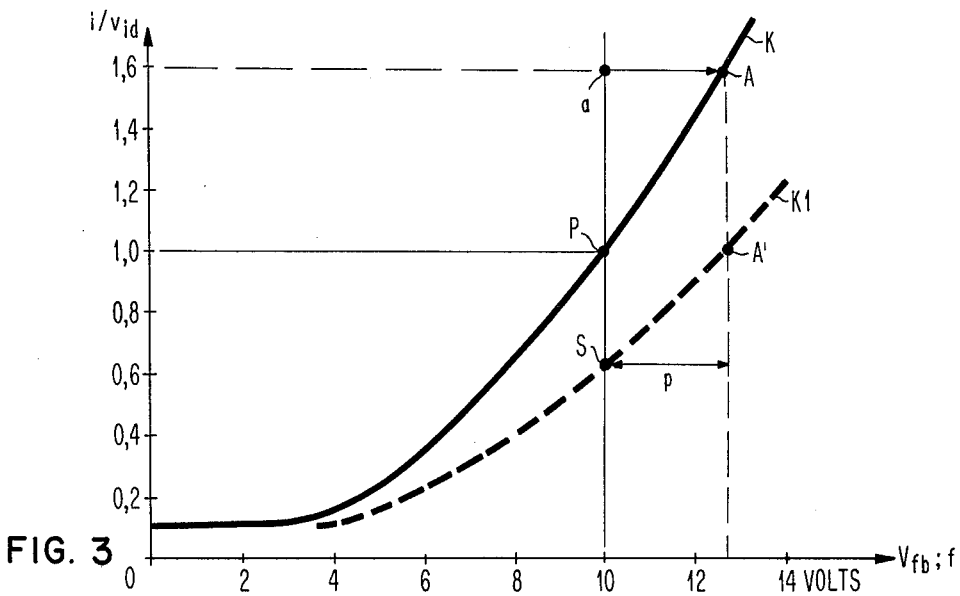
FIG. 3 is a first diagram containing a "look-up" table for illustration of the iris control mechanism when the iris setting is starting at a first starting point.
Figure 4:
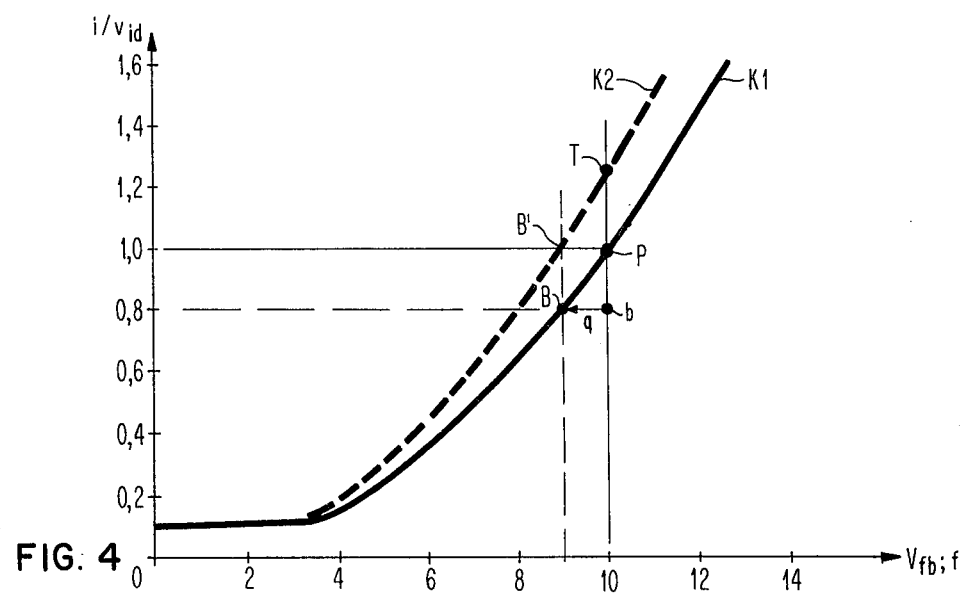
FIG. 4 is a second diagram containing a "look-up" table for illustration of the iris control mechanism when the iris setting is starting at a second starting point.

The digitized video signal dv issued by the converter 18 is supplied to a memory 38 which, in the present embodiment, serves two major purposes. First, it is used for storage of the image as seen by the video camera 14. In other words, each location or pixel of an image frame to be stored has assigned thereto a specific memory location where the intensity or signal level i (in counts) is stored. This is indicated by various intensity levels $i_1$, $i_2$, $i_3$, .... Second, the memory 38 contains a "look-up" table. Values from this "look-up" table are used for data processing purposes. Examples of the contents of such a "look-up" table are illustrated in FIGS. 3 and 4.

The data contained in the memory 38 can be called into the microprocessor 34. For this purpose the memory 38 is controlled by the microprocessor 34. Control and data transfer are indicated by a double arrow at a connection line 42 between the microprocessor 34 and the memory 38.

Associated with the microprocessor 34 is a control panel 44. This control panel 44 contains a given number of actuating devices 46-52 such as push buttons and/or hand switches. These actuating devices 46-52 are controlled manually by the operator of the digital radiographic system. They permit initiation or selection of various functions.

The push button 46, for instance, allows for starting the recording of one or more images in an actual study. The push button 48 allows for the first selection of the size of the iris 20 (initial iris adjustment). The push button 50 allows for the selection of a predetermined multiplier signal which determines the multiplication factor of a multiplier, as will become apparent later. The actuating device 52 contains a given number of individual keyboard members such as push buttons or hand switches which allow for the predetermined selection of a value $v_{id}$ which is used in the processing of the memory data. Each such value $v_{id}$ may be assigned to a specific keyboard member of the device 52.

A threshold counter 56 is used for determining the maximum digitized video signal level $i_{max}$ of all image pixels which are stored in the memory 38. To this end, the threshold counter 56 is connected to the memory 38 as well as to the microprocessor 34. The stored image pixel values $i_1, i_2, i_3, \ldots$ are successively read out of the memory 38 and compared to a first threshold value $t_I$ generated by the microprocessor 34. Then, the threshold value t is changed. Subsequently, the very same image pixel values $i=i_1, i_2, i_3, \ldots$ are compared to the next or second threshold value $t_{II}$, etc. In each cycle the threshold counter 56 compares the intensity level i of each pixel with the presently prevailing threshold value t. The number N of pixels having intensity values i exceeding the just used threshold value t is counted, and the counter 56 feeds this figure N back into the microprocessor 34. Thus, in each cycle the number N represents the number of pixels having intensity or gray values i which are larger than the threshold value t. By running the contents $i_1, i_2, i_3, \ldots$ of the memory 38 several times through the threshold counter 56 and by increasing the threshold value t in each cycle, for instance, by 1, the image pixel having the largest digitized video signal level $i_{max}$ can be found. At this point, when N equals 0 for the first time, the runs are stopped.

In order to eliminate erroneous signals, the runs may already be completed when the number N of pixels having levels i exceeding the presently applied threshold value i does not exceed a predetermined number $N_o$. This number may be e.g. $N_o=2$ (see FIG. 2).

The maximum image signal value $i_{max}$ which corresponds to the last or highest threshold value t is further processed in the microprocessor 34. This processing includes dividing the ideal value $v_{id}$ (selected at key board members 52) by the maximum image signal value $i_{max}$. The ratio $v_{id}/i_{max}$ and a corresponding signal are designated by x. This ratio x may be equal to 1 or to another number, for instance, to 1.6. The signal x is fed into a multiplier 60. Thereby the multiplier signal x determines the multiplication factor of the multiplier 60. The multiplier 60 is in particular a high speed multiplier. It is supplied by pixel data $dv'$ read out from the memory 38. In other words, the gray values $i_1, i_2, i_3, \ldots$ of the individual pixels of the stored image are successively fed into the multiplier 60 and multiplied therein by the multiplication factor x. Alternately, such multiplication could also be performed in the microprocessor 34 which comprises such multiplication capability.

The multiplied (increased, decreased or unchanged) pixel values $xi_1, xi_2, xi_3, \ldots$ are subsequently supplied to a digital-to-analog converter 62, the output of which is connected to a display device 64 such as a CRT monitor. Depending on the multiplication factor x, the image stored in the memory 38 will be displayed by the display device 64 with increased, decreased or unchanged pixel values.

The microprocessor 40 also performs another important function. It compares the actual feedback value $V_{fb}$ (see digitized signal e) with a correct feedback value obtained by aid of the "look-up" table stored in the memory 38. This will be explained in more detail in connection with FIGS. 3 and 4. As a result of the comparison, a value representing the correct iris aperture setting is obtained. This value is the error signal f which is supplied to the digital-to-analog converter 36.

The function of the digital radiographic system illustrated in FIG. 1 will now be described:

The operator starts the operation by pressing the exposure control or iris adjustment push button 48. As a result, the microprocessor 34 generates a starting error signal f which is transmitted to the digital-to-analog converter 36. The output voltage $v_{ic}$ thereof actuates the motor drive 24 which in turn moves the camera iris 22 toward a predetermined aperture starting value. This movement toward the starting value is indicated by the feedback voltage $V_{fb}$ derived from the potentiometer 30. The motor drive 24 remains in action until the predetermined aperture starting value or, what is the equivalent, until a nominal feedback value $V_{fb\text{-}nom}$ of the potentiometer 30 is reached.

It has been found in experiments that the same starting value $V_{fb\text{-}nom}$ can be applied for different studies. This value $V_{fb\text{-}nom}$ is determined experimentally. Preferably a starting value is used such that use can be made of the full dynamic range of the digital radiographic system. This dynamic range may comprise, for instance, 1024 counts or video signal levels per pixel. That means that in this example, the entire intensity range would be divided into 1024 possible values.

Next, a start signal is given to the X-ray generator 2. This signal is developed by the microprocessor 34. As a result, the X-ray generator 2 will generate a small number of X-ray pulses, the duration time of each of which may be between 5 and 100 ms. In an application where the video camera 14 is a lead oxide camera, four or five X-ray pulses are sufficient. These X-ray pulses bring the target 16 of the lead oxide camera 14 to a light equilibrium. This is important since the light output from the target 16 varies during the first several pulses. The equilibrium is achieved only during the last pulse or pulses. If the lead oxide camera 14 is back lighted, as is the case in some commonly used lead oxide cameras, the application of various X-ray pulses will not be necessary. In this case, the lead oxide camera target 16 will be at equilibrium value already at the first X-ray pulse. Generally speaking, it is of importance that the camera target is at light equilibrium value before images are taken.

After the light equilibrium has been reached, an image record signal is released. As a result, one image (the last one, if there are four or five images) is digitized in the analog-to-digital converter 18 and stored in the memory 38 for later viewing on the display device 64 and for exposure set-up. The digitized video signal levels $i_1, i_2, i_3, \ldots$ of all pixels of the image are stored in the various memory locations. Storage is under the control of the microprocessor 34.

In the next step, the maximum digitized video signal level $i_{max}$ is determined. This determination may be done across the entire image. If the image is displayed on the display device 64, this can alternately be done in a region of interest selected with a light pen or with other means.

Figure 2:
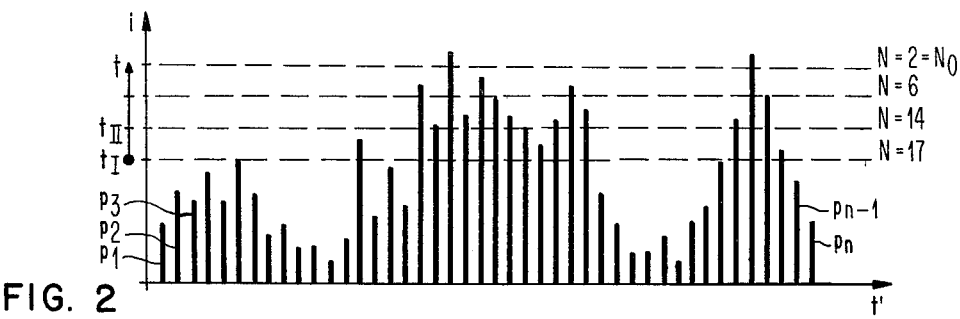
FIG. 2 is a diagram of the digital data contained in a video signal plotted versus time.

In the present embodiment, the maximum digitized video signal level $i_{max}$ is determined in the way explained above. That is, the image or an image frame is repeatedly read out of the memory 38 into the threshold counter 56. Here, in each cycle or run the individual digitized video signal levels $i_1, i_2, i_3, \ldots$ of the stored image are compared to the threshold value t generated for each run by the microprocessor 34. The number N of pixels exceeding the threshold t is counted. This is schematically illustrated in FIG. 2, where the results of four runs are shown.

This procedure is started with a comparatively low first threshold value $t=t_f$. After each run the threshold value t is gradually increased by the microprocessor 34. During each complete run, the value t is constant. Plotted is the signal level i versus time $t'$. Each vertical line illustrates the intensity of one pixel. In the illustrated example, the number N of pixels having intensities greater than t in the first run is $N=17$, in the second run $N=14$, in the third run $N=6$, and in the fourth run $N=2$. The microprocessor 34 increases the threshold value t step by step after each run until the number N of pixels having values i exceeding the threshold value t does not exceed a predetermined number $N_o$. The maximum image signal value $i_{max}$ is obtained. In the illustrated example, the number $N_o$ is chosen to be $N_o=2$. Thus, two pixels have the maximum digitized video signal level $i_{max}=i(N_o)$. After determination of the level $i_{max}$, the runs through the threshold counter 56 are terminated.

In the next step the maximum digitized video signal level $i_{max}$ is divided by an ideal video signal level $v_{id}$, thus forming the ratio x:

$$x = v_{id}/i_{max}.$$

The value $v_{id}$ is a predetermined (changeable) value which is orientated at the dynamic range of the digital radiographic system. As mentioned before, this dynamic range may comprise 1024 counts or levels for each pixel. The value $v_{id}$ is an optimum value which is selected by means of any of the push buttons 52. A preformed value $v_{id}$ may be determined experimentally. For instance, for a dynamic range of 1024 counts the value $v_{id}$ may correspond to 1000 counts. More generally, the range from which the value $v_{id}$ will be chosen may extend from 800 to 1023 counts, if the dynamic range comprises 1024 counts.

In the ratio $x = v_{id}/i_{max}$, the value $i_{max}$ of the first image taken will generally not be equal to the ideal signal value $v_{id}$. This, the ratio x will generally not be equal to 1. This deviation may be due to the setting of the X-ray generator 2 which may change from time to time. It may also be due to the thickness of the patient 6, to the body anatomy (bone, skin, tissue, etc.), and to other parameters. All these parameters must be addressed when a correct exposure level is to be achieved. This is done by the control circuit which calculates the correct setting of the aperture and corrects the obtained values correspondingly.

The value of the ratio x is used to determine the required adjustment of the iris size and therefore to set the light intensity to a proper level. Knowing from the ratio X whether the iris aperture should be increased or decreased and knowing the correct iris encoder feedback voltage $V_{fb}$ from the "look-up" table stored in the memory 38, the iris motor drive voltage $v_{ic}$ can be incremented or decremented (by successive approximation to increase response time) until the encoder voltage $V_{fb}$ equals the value (correct iris encoder feedback voltage) $V_{fb\text{-}cor}$ read from the memory 38.

In the preferred imaging system the encoder voltage $V_{fb}$ is sampled and digitized in the analog-to-digital converter 32 under control of the microprocessor 34 and subsequently compared to the correct value $V_{fb\text{-}cor}$ read from the "look-up" table. When the value falls within preset limits, the iris adjustment is complete.

This provides an accurate method to repeatedly set the aperture of the iris 20 to a favorable value.

After an iris adjustment has been performed, an image of the patient 6 can be repeated with the new iris setting.

In contrast to this procedure or in addition thereto, the value of the ratio $v_{id}/i_{max}$ can be used to multiply each of the former image pixel intensity values to obtain the correct signal value for display to the operator on the monitor 64. This image relates closely to images taken during a study sequence with a new adjusted iris setting. If the image contrast is unsatisfactory, the operator can increase or decrease it under push button control by changing the value $v_{id}$. From FIG. 1 can be seen that the multiplier 60 (or the microprocessor 34) will multiply the intensities of the individual image pixels with the correction factor x, and subsequently the corrected image will be displayed.

FIGS. 3 and 4 are representations of a "look-up" table. They show a calibration curve K in a diagram which is made up of the feedback voltage $V_{fb}$ and the ratio $i_{max}/v_{id}$. The calibration curve K is not a straight curve. In the lower portion it is located above the value $i_{max}/v_{id}=0$ due to a noise level. In the upper portion, the curve K is approximately a square function.

The examples shown in FIGS. 3 and 4 are selected such that at a feedback voltage $V_{fb}$ of 10 volts (measured at the potentiometer 30) an ideal operation point P prevails in which the measured image signal $i_{max}$ is equal to the ideal image signal $v_{id}$, that is in which $_{max}/v_{id}=1$. This point P is contained in the "look-up" table K (which is stored in the memory). If the feedback voltage $V_{fb}$ increases, the aperture of the iris 20 also increases, and if the feedback voltage $V_{fb}$ decreases, the aperture of the iris 20 decreases correspondingly.

According to FIG. 3 it is assumed that at the starting point a feedback voltage $V_{fb}$ equaling 10 volts prevails and that, nevertheless, the measured image is darker than it should be, for instance, due to a changed setting at the X-ray generator or due to an excessive thickness of the patient. In other words, the maximum image signal value $i_{max}$ is smaller than the ideal maximum image signal value $v_{id}$. It is also assumed that the chosen value $v_{id}$ is $v_{id}=0.8$ volts corresponding to 800 counts in a pixel, and that the value $i_{max}$ is $i_{max}=0.5$ volts corresponding to 500 counts. From these values, the ratio $i_{max}/v_{id}=1.6$. Thus, an operational status is assumed which is designated in FIG. 3 with the character (a). Since in this case the ratio is greater than 1, the aperture of the iris 20 must be increased. That means in the present example that the voltage $V_{ic}$ at the motor drive 24 must be increased starting from 10 volts. The required increase of voltage p can be seen in FIG. 3. It is obtained by means of the illustrated "look-up" table K. The voltage must be increased such that the calibration curve K is arrived at in point A. A corrected voltage value $V_{fb\text{-}cor}$ equals 12.6 volts corresponds to the point A. The potentiometer 30 must show this voltage value $V_{fb\text{-}cor}$, thereby indicating that the aperture of the iris 20 has attained a size such that the ideal value $v_{id}=0.8$ volts (corresponding to 800 counts) is reached. A voltage value $V_{ic}$ corresponding to $V_{fb\text{-}cor}=12.6$ volts is fed into the motor drive 24. In other words, the voltage $V_{fb}$ must be increased by $p=2.6$ volts in order to achieve a reasonable aperture size. An soon as the potentiometer voltage is 12.6 volts, the correct iris aperture setting is reached. In this setting, the signal value for the optimum image contrast is obtained. If in a next image this iris setting corresponding to 12.6 volts is used, a ratio $i_{max}/v_{id}=1$ will be reached. This point of operation is designated in FIG. 3 with the reference letter A'. This point A' is located on the curve K1. The curve K1 is the true calibration curve under the prevailing circumstances. The curve K1 distinguished from the curve K by a factor x. The point A' describes the aperture position for the next image to be taken or for the next sequence of images.

It should be pointed out that the starting point for the feedback voltage $V_{fb}$ may be different from 10.0 volts. For instance, it may be 8.0 volts.

According to FIG. 4 it is now assumed that the ratio $i_{max}/v_{id}$ is smaller than 1. This is in contrast to FIG. 3. In this case, the brightness of the first image is intenser than the ideal value, and the size of the iris aperture must be decreased. In FIG. 4 it is further assumed that $v_{id}$ corresponds to 700 counts and that $i_{max}$ corresponds to 1000 counts. That is that in the point b at $V_{fb}=10$ volts, a ratio $i_{max}/v_{id}=0.8$ is present.

In order to decrease the iris aperture, the voltage at the potentiometer 30 must be made smaller. The decrease of the iris aperture is performed with the motor drive 24. The value of the new or correct potentiometer voltage $V_{fb-cor}$ is also shown in FIG. 4. It is 9 volts. That is, the motor voltage must be reduced such that the horizontal line hits the calibration curve K in point B. To this point B corresponds the potentiometer voltage $V_{fb-cor}=9.0$ volts. The voltage decrease is $q=1.0$ volts.

In the next image taken, this position (resulting in a voltage $V_{fb-cor}=9$ volts of the potentiometer) is maintained. Due to the resultng decrease of light intensity at the light input of the TV camera 14, the ratio $i_{max}/v_{id}$ has now increased to the value 1.0. This point (which should be reached in this example) is designated as B' in FIG. 4. It is located on the new or true curve K2. The point B' characterizes the intensity of the next image.

It should be mentioned that not only the ratio $i_{max}/v_{id}$ can be used. The reverse ratio $v_{id}/i_{max}$ also could be stored in the "look-up" tables of FIGS. 3 and 4.

According to FIGS. 3 and 4 the control function of the digital radiographic system can be summarized as follows: If the ratio x is greater than 1, the iris aperture will be opened, and it will be decreased in size if the ratio x is less than 1. Having calculated the ratio $i_{max}/v_{id}$, the microprocessor 34 goes to the normalized "look-up" table K in the memory, and the correct iris feedback voltage $V_{fb-cor}$ is read out which gives the correct iris aperture setting to get the optimum signal level for high image contrast.

The advantages of the illustrated system and method may be summarized as follows:

(A) By taking ratio $v_{id}/i_{max}$ and using a "look-up" table K (see FIGS. 3 and 4), the desired iris aperture opening can accurately be determined. This aperture is required to obtain good images.

(B) By digitizing the output voltage of the iris feedback encoder potentiometer 30 and comparing it to the "look-up" table value, the iris aperture can be accurately set by means of the voltage $V_{ic}$.

(C) Multiplying each pixel by the ratio $v_{id}/i_{max}$ in the multiplier 60 and displaying the image on the monitor screen 64, the operator can see the contrast of the final image and correct it, if it is unsatisfactory.

(D) With a back lighted lead oxide camera tube, the patient is exposed only once to X-rays. The patient is exposed at most 3 to 4 times if the lead oxide is not backlighted. With a previously proposed method the patient is continuously exposed while the iris is being adjusted to get the correct signal level. In the previously proposed semi-automatic method, the iris is normally set within three exposure runs.

The present method minimizes patient exposure because the patient need only be exposed once, and the physician can see the image quality before a long exposure sequence is started with the correct iris setting.

While the digital radiographic system and method herein described constitute preferred embodiments of the invention, it is to be understood that the invention is not limited to these precise forms of assembly and process, respectively, and that a variety of changes may be made therein without departing from the scope of the invention.

What is claimed is:

1. A digital radiographic system, comprising in combination:
    (a) an X-ray detector for receiving X-ray radiation from an object under examination, said detector generating a detector image in accordance with the distribution of said X-ray radiation received from said object;
    (b) an image intensifier including a screen and means for enhancing said detector image, thereby generating an image intensifier image on said screen, said image intensifier image emitting light;
    (c) a video camera for viewing said image intensifier image and thereby receiving said light, said video camera generating a video signal comprised of frames of digital data describing various signal levels in accordance with said image intensifier image;
    (d) display means operationally connected to said video camera for receiving said video signal and for displaying an image in accordance with said distribution of X-ray radiation;
    (e) an iris arranged between said image intensifier and said video camera, said iris having an aperture of variable size for controlling the intensity of light transmitted therethrough, thereby controlling the intensity of said light transmitted from said image intensifier to said video camera;
    (f) control means for controlling the aperture of said iris, said control means comprising:
        (f1) first storage means for receiving said video signal and for storing digital data corresponding to one of said frames;
        (f2) threshold means for determining the maximum signal level of the digital data contained in said one frame;
        (f3) second storage means for storing information about parameter values indicative of a plurality of sizes of said aperture and about maximum image signal levels corresponding to said sizes;
        (f4) means for evaluating from said maximum signal level determined by said threshold means and from said information stored in said second storage means a desired parameter indicative of a desired size of said aperture;
        (f5) means for setting the actual size of said aperture, said setting means being responsive to said desired parameter evaluated by said evaluating means.

2. The digital radiographic system according to claim 1, wherein said second storage means has stored therein a "look-up" table containing:

(a) parameter values indicative of said plurality of sizes of said aperture, and
(b) values of the quotient of the maximum signal level divided by an ideal signal level, said quotient values being plotted versus said parameter values.

3. The digital radiographic system according to claim 2, wherein said evaluating means comprises:
(a) division means for providing the inverse ratio of said maximum signal level determined by said threshold means and of a predetermined ideal signal value;
(b) means for looking up said desired parameter value in said "look-up" table, said desired parameter value being equal to the parameter value corresponding to said inverse ratio;
and wherein said setting means comprises:
(c) drive means for controlling the size of said aperture, and
(d) means for applying said desired parameter value to said drive means.

4. The digital radiographic system according to claim 3, wherein said evaluating means further comprises:
(a) means for determining an actual parameter value corresponding to the actual size of said aperture;
(b) means for comparing said desired parameter value with said actual parameter value and for forming the difference between said compared values, said comparing means controlling said drive means in dependence on said difference.

5. The digital radiographic system according to claim 1, wherein said first and second storage means are combined in a single memory.

6. The digital radiographic system according to claim 3, wherein said threshold means comprises a threshold counter having a signal input connected to said first storage means for receiving the digital data contained in said frame stored therein, and having a threshold input being supplied by a predetermined threshold value, said threshold counter counting the number of those pixels in said frame which have signal levels exceeding said predetermined threshold value.

7. The digital radiographic system according to claim 6, wherein said threshold means further comprises means for increasing said predetermined threshold value, said increasing means being activated when said counted pixel number exceeds a predetermined count number.

8. The digital radiographic system according to claim 1, wherein said means for setting the actual size of said aperture comprises an electric motor.

9. The digital radiographic system according to claim 8, further comprising sensor means for determining an actual parameter value corresponding to the actual size of said iris aperture, said sensor means comprising a potentiometer supplied by an electrical source and driven by said motor, said potentiometer delivering a sensor voltage which is related to the actual size of said iris aperture.

10. The digital radiographic system according to claim 2, further comprising means for controlling said ideal signal value.

11. The digital radiographic system according to claim 1, wherein a microprocessor is provided for controlling said first and a second storage means and for evaluating said desired parameter.

12. The digital radiographic system according to claim 1, wherein a multiplier is connected between said second storage means and said display means, said multiplier having a multiplication factor which equals said inverse ratio, and said multiplier multiplying said level of each pixel by said multiplication factor before display by said display means.

13. A method for automatically adjusting the aperture size of the iris in a digital radiographic system which system generates images of an object under examination, comprising the steps of:
(a) generating a light emitting image of said object under examination;
(b) generating a video signal comprised of digital data assigned to the intensities of a plurality of pixels of said image;
(c) storing said video signal;
(d) determining a highest data level among said plurality of pixels;
(e) comparing said highest data level to predetermined maximum signal levels related to predetermined aperture sizes of said iris, thereby evaluating a desired parameter which is indicative of a desired size of said aperture; and
(f) adjusting the actual size of said aperture in accordance with said evaluated desired parameter.

14. The method according to claim 13, wherein an ideal maximum signal value is divided by said highest data level, thereby forming the inverse ratio of said highest data level and said maximum signal value, and selecting said desired parameter value from a "look-up" table which contains values of the quotient of the maximum signal level divided by said ideal signal value plotted versus said parameter values.

15. The method according to claim 13, further comprising the steps of repeatedly reading out said stored video signal, thereby comparing said data levels of said pixels with a predetermined threshold value, and counting the number of pixels having data levels lying above said predetermined threshold value.

16. The method according to claim 15, wherein said threshold value is increased after each step of reading out said stored video signal, until said number has reached a preselected pixel count number.

* * * * *